(12) United States Patent
Jin

(10) Patent No.: US 12,566,135 B2
(45) Date of Patent: Mar. 3, 2026

(54) TRANSMISSIVE OPTICAL SENSOR AND METHOD OF FABRICATING SAME

(71) Applicant: OIP Technology Pte Ltd, Singapore (SG)

(72) Inventor: Yonggang Jin, Singapore (SG)

(73) Assignee: OIP Technology Pte Ltd, Singapore (SG)

( * ) Notice: Subject to any disclaimer, the term of this patent is extended or adjusted under 35 U.S.C. 154(b) by 84 days.

(21) Appl. No.: 18/761,673

(22) Filed: Jul. 2, 2024

(65) Prior Publication Data
US 2025/0389653 A1     Dec. 25, 2025

(30) Foreign Application Priority Data
Jun. 20, 2024     (CN) .......................... 202410804049.6

(51) Int. Cl.
    *G01N 21/59*         (2006.01)
(52) U.S. Cl.
    CPC .................................. *G01N 21/59* (2013.01)
(58) Field of Classification Search
    CPC ...................................................... G01N 21/59
    See application file for complete search history.

(56) References Cited

U.S. PATENT DOCUMENTS 6,961,114 B2 * 11/2005 Murayama .......... G03F 7/70058
                                                    355/30
7,009,302 B2 * 3/2006 Tao ...................... B81B 7/0077
                                                    257/419

* cited by examiner

*Primary Examiner* — Seung C Sohn
(74) *Attorney, Agent, or Firm* — MUNCY, GEISSLER, OLDS & LOWE, P.C.

(57)         ABSTRACT
A transmissive optical sensor and method of fabricating it are disclosed. The transmissive optical sensor includes a transmitter, a signal exciter and a receiver, which are sequentially stacked together. The transmitter includes first plastic encapsulation, and the receiver includes second plastic encapsulation. The first plastic encapsulation defines a light exit region, the second plastic encapsulation has a photosensitive element. The signal exciter has first and second optically transmissive ends. The light exit region is aligned with the first optically transmissive end, and the photosensitive element with the second optically transmissive end. Both the transmitter and the receiver are provided as plastic encapsulations with flat surfaces, which can be either vertically stacked, or horizontally juxtaposed, with the signal exciter. In this way, it is unnecessary to arrange the transmitter and the receiver on a PCB or couple them with a support frame, significantly reducing the size of the transmissive optical sensor.

14 Claims, 2 Drawing Sheets

TRANSMISSIVE OPTICAL SENSOR AND METHOD OF FABRICATING SAME

CROSS-REFERENCE TO RELATED APPLICATION

This application claims the priority of Chinese patent application number 202410804049.6, filed on Jun. 20, 2024, the entire contents of which are incorporated herein by reference.

TECHNICAL FIELD

The present invention relates to the field of optical sensors, and in particular, to a transmissive optical sensor and a method of fabricating it.

BACKGROUND

A photoelectric sensor is a device used to convert an optical signal into its electrical representation. Specifically, it includes a transmitter for emitting visible, infrared or other "light" and a receiver for detecting a change in the amount of light reflected from, or blocked by, an object being detected, from which an output signal is derived. Generally, photoelectric sensors include reflective and transmissive ones. The transmitter and receiver of a reflective photoelectric sensor are arranged on the same side of the sensor, while the transmitter and receiver of a transmissive photoelectric sensor are arranged on opposite sides thereof.

In a conventional transmissive photoelectric sensor, the transmitter and receiver are arranged on a single printed circuit board (PCB) board and on opposite sides of a hermetic chamber, and the transmitter, hermetic chamber and receiver are all coupled to a support frame. Consequently, the transmissive photoelectric sensor has a large size.

SUMMARY OF THE INVENTION

It is an objective of the present invention to provide a transmissive optical sensor with a reduced size and a method of fabricating the transmissive photoelectric sensor.

To this end, the present invention provides a transmissive optical sensor including a transmitter, a signal exciter and a receiver, which are sequentially stacked together, the transmitter including a first plastic encapsulation, the receiver including a second plastic encapsulation, the first plastic encapsulation defining a light exit region, the second plastic encapsulation having a photosensitive element, the signal exciter having a first optically transmissive end and a second optically transmissive end, which oppose each other, the light exit region aligned with the first optically transmissive end, the photosensitive element aligned with the second optically transmissive end.

Optionally, the first plastic encapsulation may include a first plastic encapsulation layer, a light-emitting unit, first conductive vias, a first electrical connection structure and a second electrical connection structure, the first plastic encapsulation layer having a first front side and a first backside opposing the first front side, the light-emitting unit defining the light exit region on the first front side, the light-emitting unit embedded in the first plastic encapsulation layer so that at least the light exit region is exposed on the first front side of the first plastic encapsulation layer and that the at least a surface portion of the light-emitting unit is exposed on the first backside, the first conductive vias disposed external to the light-emitting unit and extending through the first front side and the first backside, the first electrical connection structure disposed on the first front side and electrically connected to the light-emitting unit, the second electrical connection structure disposed on the first backside and electrically connected to the light-emitting unit, the first electrical connection structure electrically connected to the second electrical connection structure by the first conductive vias.

Optionally, the light-emitting unit may include a light-emitting device and a conductive component electrically connected to the light-emitting device, the light-emitting device disposed proximal to the first front side, the conductive component disposed proximal to the first backside, the conductive component exposed on the first backside of the first plastic encapsulation layer, and wherein the light exit region exposed on the first front side of the first plastic encapsulation layer.

Optionally, the light-emitting device may include a light-emitting body, a first electrode, a second electrode and the light exit region, the first electrode disposed proximal to the first backside, the second electrode disposed on the same side as the light exit region and proximal to the first front side, wherein light is emitted from the light exit region during operation of the light-emitting unit, and wherein the second electrode and the light exit region are exposed on the first front side of the first plastic encapsulation layer, and the conductive component is exposed on the first backside of the first plastic encapsulation layer.

Optionally, the transmitter may further include an optical filter structure which is affixed to the first plastic encapsulation so that the light exit region is oriented towards the optical filter structure.

Optionally, the second plastic encapsulation may include a second plastic encapsulation layer, a driver chip, second conductive vias, a third electrical connection structure and a fourth electrical connection structure, the second plastic encapsulation layer having a second front side and a second backside opposing the second front side, the driver chip having the photosensitive element on the second front side, the driver chip embedded in the second plastic encapsulation layer so that at least the photosensitive element is exposed on the second front side of the second plastic encapsulation layer, the second conductive vias disposed external to the driver chip and extending through the second front side and the second backside, the third electrical connection structure disposed on the second front side and electrically connected to the driver chip, the fourth electrical connection structure disposed on the second backside, the third electrical connection structure electrically connected to the fourth electrical connection structure by the second conductive vias.

Optionally, the driver chip may further include a main body and an I/O port disposed on the same side of the main body as the photosensitive element and spaced apart therefrom, the main body disposed proximal to the second backside, the I/O port and the photosensitive element disposed proximal to the second front side so as to be exposed on the second front side of the second plastic encapsulation layer.

Optionally, the signal exciter may be a closed hermetic chamber.

Optionally, the hermetic chamber may include a chamber body open at its opposite ends and transparent closure members disposed at the respective openings at the opposite ends of the chamber body, the chamber body including a chamber member open at its opposite ends and a coil wound on the exterior of a wall of the chamber member, the two transparent closure members closing the respective openings at the opposite ends of the chamber body, thereby defining a closed cavity, wherein the first optically transmissive end is defined proximal to the transmitter and the second optically transmissive end to the receiver.

Optionally, the metal rubidium or cesium may be filled in the closed cavity.

Optionally, the openings of the chamber member at its opposite ends may match in shape the transparent closure members, wherein the transparent closure members are made of glass.

In another aspect, the present invention also provides a method of fabricating the transmissive optical sensor as defined above, which includes the steps of: providing a first carrier plate and forming the first plastic encapsulation on the first carrier plate, wherein the first plastic encapsulation defines the light exit region; providing a second carrier plate and forming the second plastic encapsulation on the second carrier plate, wherein the second plastic encapsulation has the photosensitive element; and providing the signal exciter having the first optically transmissive end and the second optically transmissive end, which oppose each other, between the first plastic encapsulation and the second plastic encapsulation so that the light exit region is aligned with the first optically transmissive end and the photosensitive element with the second optically transmissive end.

Optionally, forming the first plastic encapsulation may include: providing the first carrier plate and forming a first adhesive layer on one side of the first carrier plate; providing the light-emitting unit on the first adhesive layer, which defines the light exit region, so that the light exit region is oriented towards the first carrier plate, applying a plastic encapsulation material around the light-emitting unit, and solidifying the plastic encapsulation material to form the first plastic encapsulation layer having the first front side and the first backside opposing the first front side; removing the first carrier plate; forming the plurality of first conductive vias in the first plastic encapsulation layer, which extend through the first front side and the first backside; forming the first electrical connection structure on the first front side and the second electrical connection structure on the first backside, wherein the first electrical connection structure is electrically connected to the first conductive vias on the first front side and to the first electrode in the light-emitting device, and the second structure is electrically connected to the first conductive vias and the conductive component on the first backside; and attaching the optical filter structure to the first front side.

Optionally, forming the second plastic encapsulation may include: providing the second carrier plate and forming a second adhesive layer on one side of the second carrier plate; providing the driver chip on the second adhesive layer, which has the photosensitive element, so that the photosensitive element is oriented towards the second carrier plate, applying a plastic encapsulation material around the driver chip, and solidifying the plastic encapsulation material to form the second plastic encapsulation layer having the second front side and the second backside opposing the second front side; removing the second carrier plate; forming the plurality of second conductive vias in the second plastic encapsulation layer, which extend through the second front side and the second backside; and forming the third electrical connection structure on the second front side and the fourth electrical connection structure on the second backside, wherein the third electrical connection structure is electrically connected to the second conductive vias on the second front side and to the I/O port in the driver chip, and the fourth structure is electrically connected to the second conductive vias on the second backside.

Compared with the prior art, the present invention has the surprising benefits as follows:

It provides a transmissive optical sensor and method of fabricating it. The transmissive optical sensor includes a transmitter, a signal exciter and a receiver, which are sequentially stacked together. The transmitter includes a first plastic encapsulation, and the receiver includes a second plastic encapsulation. The first plastic encapsulation defines a light exit region, and the second plastic encapsulation has a photosensitive element. The signal exciter has a first optically transmissive end and a second optically transmissive end, which oppose each other. The light exit region is aligned with the first optically transmissive end, and the photosensitive element with the second optically transmissive end. According to the present invention, both the transmitter and the receiver are provided as plastic encapsulations with flat surfaces, which can be either vertically stacked, or horizontally juxtaposed, with the signal exciter. In this way, it is unnecessary to arrange the transmitter and the receiver on a PCB or couple them with a support frame, significantly reducing the size of the transmissive optical sensor.

LIST OF REFERENCE NUMERALS

10 transmitter; 20 signal exciter; 30 receiver; 110 first plastic encapsulation layer; 120 light-emitting device; 121 first electrode; 122 second electrode; 123 light exit region; 124 light-emitting body; 130 conductive component; 140 first conductive vias; 210 first passivation layer; 220 first metal layer; 230 second passivation layer; 240 third passivation layer; 250 second metal layer; 260 fourth passivation layer; 270 first via hole; 280 optical filter structure; 310 second plastic encapsulation layer; 320 driver chip; 321 main body; 322 I/O port; 323 photosensitive element; 330 second conductive via; 410 fifth passivation layer; 420 third metal layer; 430 sixth passivation layer; 440 seventh passivation layer; 450 fourth metal layer; 460 eighth passivation layer; 470 second via hole; 501 closed cavity; 510 chamber member; 521 first optically transmissive end; 522 second optically transmissive end; 530 coil.

DETAILED DESCRIPTION

Transmissive optical sensors and methods according to the present invention will be described in greater detail below. The present invention will be described in greater detail below with reference to the accompanying schematic drawings, which present preferred embodiments of the invention. It would be appreciated that those skilled in the art can make changes to the invention disclosed herein while still obtaining the beneficial results thereof. Therefore, the following description shall be construed as being intended to be widely known by those skilled in the art rather than as limiting the invention.

For the sake of clarity, not all features of an actual implementation are described in this specification. In the following, description and details of well-known functions and structures are omitted to avoid unnecessarily obscuring the invention. It should be appreciated that in the development of any such actual implementation, numerous implementation-specific decisions must be made to achieve specific goals of the developers, such as compliance with system-related and business-related constrains, which may vary from one implementation to another. Moreover, it should be appreciated that such a development effort might be complex and time consuming, but would nevertheless be a routine undertaking for those of ordinary skill in the art.

In the following paragraphs, the present invention will be described in greater detail by way of examples with reference to the accompanying drawings. Advantages and features of the present invention will become more apparent from the following description. Note that the figures are provided in a very simplified form not necessarily drawn to exact scale for the only purpose of facilitating easy and clear description of the disclosed embodiments.

Figure 1:
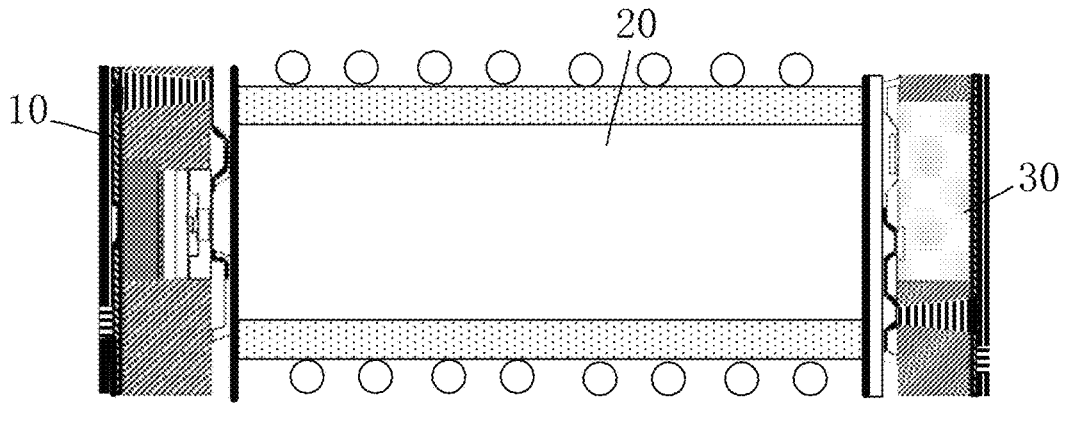
FIG. 1 is a schematic diagram showing the structure of a transmissive optical sensor according to an embodiment of the present invention.

As shown in FIG. 1, a transmissive optical sensor according to an embodiment of the present invention includes a transmitter 10, a signal exciter 20 and a receiver 30, which are sequentially stacked together. Referring to FIGS. 1 to 6, the transmitter 10 has a light exit region 123, and the receiver 30 has a photosensitive element 323. The signal exciter 20 has a first optically transmissive end 521 and a second optically transmissive end 522, which oppose each other. The light exit region 123 is oriented towards, and aligned with, the first optically transmissive end 521. The photosensitive element 323 is oriented towards, and aligned with, the second optically transmissive end 522.

The transmitter 10 can provide light beams of different wavelengths, and the signal exciter 20 is configured to produce gaseous metal atoms moving in a determined direction. Any of the light beams can excite a transition of the gaseous metal atoms, generating a clock frequency signal on the order of picoseconds. The receiver 30 can receive the signal and pass the signal to an external processing unit (e.g., a central processing unit).

Figure 2:
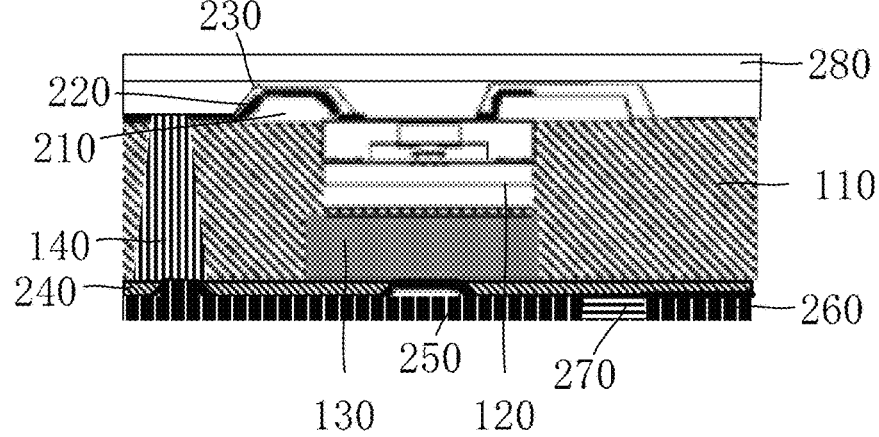
FIG. 2 is an enlarged schematic cross-sectional view of a transmitter according to an embodiment of the present invention.

As shown in FIG. 2, the transmitter 10 includes a first plastic encapsulation and an optical filter structure 280. The first plastic encapsulation defines the light exit region 123, and the optical filter structure 280 is affixed to the first plastic encapsulation so that the light exit region 123 is oriented towards the optical filter structure 280. The optical filter structure 280 may be a light polarizing sheet which is adhesively attached to the first plastic encapsulation so as to shade the light exit region 123. In this way, a light beam exiting the first plastic encapsulation can be polarized and directed into the signal exciter 20 by the light polarizing sheet.

The first plastic encapsulation includes a first plastic encapsulation layer 110, a light-emitting unit, first conductive vias 140, a first electrical connection structure and a second electrical connection structure. The first plastic encapsulation layer 110 has a first front side and a first backside, which oppose each other. The light-emitting unit defines the light exit region 123 on the first front side. The light-emitting unit is embedded in the first plastic encapsulation layer 110 so that at least the light exit region 123 is exposed on the first front side of the first plastic encapsulation layer 110 and that at least a surface portion of the light-emitting unit is exposed on the first backside. The first conductive vias 140 are disposed external to the light-emitting unit and extend through both the first front side and the first backside. The first electrical connection structure is disposed on the first front side and electrically connected to the light-emitting unit on the first front side. The second electrical connection structure is disposed on the first backside and electrically connected to the light-emitting unit on the first backside. Thus, the first conductive vias 140 electrically connect the first electrical connection structure to the second electrical connection structure. In order to minimize the thickness of the first plastic encapsulation, it is made as thick as the light-emitting unit. Therefore, the light-emitting unit is exposed on both the first front side and the first backside of the first plastic encapsulation layer 110.

The light-emitting unit includes a light-emitting device 120 and a conductive component 130, the conductive component 130 is electrically connected to the light-emitting device 120. The light-emitting device 120 is disposed proximal to the first front side, and the conductive component 130 is disposed proximal to the first backside. A surface of the conductive component 130 proximal to the first backside of the first plastic encapsulation layer 110 is exposed on the first plastic encapsulation layer 110, and the light exit region is exposed on the first front side of the first plastic encapsulation layer 110. Further, a silver paste is provided between the conductive component 130 and the light-emitting device 120 and adhesively bonds the conductive component 130 to the light-emitting device 120. In this way, the conductive component 130 is vertically electrically connected to the light-emitting device 120 by the silver paste. Furthermore, the conductive component 130 can provide good heat dissipation.

Figure 3:
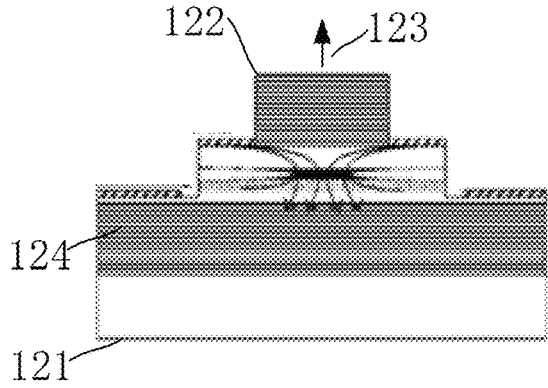
FIG. 3 is an enlarged schematic cross-sectional view of a receiver according to an embodiment of the present invention.
Figure 4:
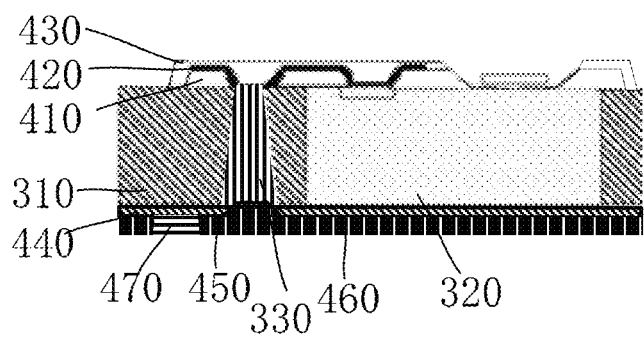
FIG. 4 is an enlarged schematic cross-sectional view of a signal exciter according to an embodiment of the present invention.

As shown in FIG. 3, the light-emitting device 120 may be a light-emitting diode (LED), a vertical-cavity surface-emitting laser (VCSEL) or the like. It is configured to emit signals in the form of light of different wavelengths. The light-emitting device 120 includes a light-emitting body 124, a first electrode 121, a second electrode 122 and the light exit region 123. As an example, the first electrode 121 is a cathode of the light-emitting unit and is disposed proximal to the first backside, and the second electrode 122 is arranged on the same side as the light exit region 123 proximal to the first front side. For example, the second electrode 122 is a positive electrode of the light-emitting unit. Light (e.g., infrared radiation) shines from the light exit region 123 during operation of the light-emitting unit. The second electrode 122 and the light exit region 123 are exposed on the first front side of the first plastic encapsulation layer 110, and the surface of the conductive component 130 proximal to the first backside of the first plastic encapsulation layer 110 is exposed on the first plastic encapsulation layer 110.

A plurality of first conductive vias 140 may be provided in the first plastic encapsulation layer 110, and all of the first conductive vias 140 may extend through both the first front side and the first backside of the first plastic encapsulation layer 110 in the direction of its thickness. The first conductive vias 140 are used to electrically connect the first electrical connection structure on the first front side to the second electrical connection structure on the first backside.

The first conductive vias 140 may be made of, for example, a conductive metal such as copper (Cu), tungsten (W), silver (Ag) or gold (Au), a conductive alloy or a conductive paste.

The first electrical connection structure is electrically connected to the first conductive vias 140 at the first front side. It is also electrically connected to the first electrode 121 in the light-emitting device 120. The first electrical connection structure includes a first passivation layer 210, a first metal layer 220 and a second passivation layer 230, which are sequentially formed over the first front side. The first passivation layer 210 covers part of the first front side, while the second electrode 122 and the light exit region 123 in the light-emitting device 120 are exposed from the first passivation layer 210. Moreover, the first conductive vias 140 are exposed on the first front side, the first conductive vias 140 are electrically connected to the second electrode 122. The first metal layer 220 includes a plurality of first solder pads scattered on the first passivation layer 210.

The second passivation layer 230 covers both the first passivation layer 210 and the first metal layer 220. The first passivation layer 210 and the second passivation layer 230 are used to electrically isolate the first metal layer 220 to prevent it from being shorted. The light exit region 123 is exposed from the second passivation layer 230.

The first passivation layer 210 and the second passivation layer 230 are each made of an insulating material such as a polymer material. Examples of the polymer material may include polyimide (PI), benzocyclobutene (BCB), poly (p-phenylene-2,6-benzobisoxazole) (PBO) and combinations thereof. The first passivation layer 210 and the second passivation layer 230 may be made of the same material or different materials. In the present embodiment, the first passivation layer 210 and the second passivation layer 230 are made of the same material such as PI.

The first metal layer 220 may be made of a metal material, such as Cu, Ag, W or Au, a conductive alloy, an inorganic material such as a conductive oxide (e.g., ITO), or a conductive organic material such as a conductive polymer. The first metal layer 220 may have a thickness of about 3 μm to 10 μm, preferably 3 μm to 5 μm, above a surface of the first passivation layer 210.

The second structure is electrically connected to the first conductive vias 140 and the conductive component 130 on the first backside. The second structure includes a third passivation layer 240, a second metal layer 250 and a fourth passivation layer 260, which are sequentially formed over the first backside. The third passivation layer 240 covers the first backside, while a surface portion of the light-emitting unit is exposed from the third passivation layer 240. Moreover, the first conductive vias 140 are exposed on the first backside. In greater detail, the third passivation layer 240 covers the first backside, with a surface portion of the conductive component 130 in the light-emitting unit distal from the first front side remaining exposed from the third passivation layer 240 and with the first conductive vias 140 being exposed on the first backside.

The second metal layer 250 includes a plurality of second solder pads, which are scattered on the third passivation layer 240 and electrically connected to the first conductive vias 140 and to the conductive component 130. It is to be noted that while the first conductive vias 140 are electrically connected to the second metal layer 250, the first conductive vias 140 may be either electrically connected to the conductive component 130 or not, depending on the requirements of practical applications.

The fourth passivation layer 260 covers both the third passivation layer 240 and the second metal layer 250. The third passivation layer 240 and the fourth passivation layer 260 are used to electrically isolate the second metal layer 250 to prevent it from being shorted. There are at least two first via holes 270 in the fourth passivation layer 260, each first via hole 270 exposes the second metal layer 250. A conductive material is filled in the first via holes 270 to allow electrical connection to an external circuit (e.g., a printed circuit board (PCB) or flexible printed circuit (FPC)).

The third passivation layer 240 and the fourth passivation layer 260 are each made of an insulating material such as a polymer material. Examples of the polymer material may include PI, BCB, PBO and combinations thereof. The first passivation layer 210, the second passivation layer 230, the third passivation layer 240 and the fourth passivation layer 260 may be made of the same material. Alternatively, some of them may be made of the same material, while the remaining ones are made of different materials. Still alternatively, each of them may be made of a different material. In the present embodiment, the third passivation layer 240 and the fourth passivation layer 260 are made of the same material such as PI.

The second metal layer 250 may be made of a metal material, such as Cu, Ag, W or Au, a conductive alloy, an inorganic material such as a conductive oxide (e.g., ITO), or a conductive organic material such as a conductive polymer. The second metal layer 250 may have a thickness of about 3 μm to 10 μm, preferably 3 μm to 5 μm, above a surface of the third passivation layer 240.

In the present embodiment, the light-emitting unit is embedded in the plastic encapsulation material (first plastic encapsulation layer 110) of the first plastic encapsulation, and a thin-film wiring (the first metal layer 220, the second metal layer 250 and the first conductive vias 140) is fabricated on the plastic encapsulation material. This reduces the size of the optical sensor, resulting in space savings.

The receiver 30 includes a second plastic encapsulation including a second plastic encapsulation layer 310, a driver chip 320, second conductive vias 330, a third electrical connection structure and a fourth electrical connection structure. The second plastic encapsulation layer 310 has a second front side and a second backside, which oppose each other. The driver chip 320 includes a photosensitive element 323 disposed on the second front side. The driver chip 320 is embedded in the second plastic encapsulation layer 310 so that at least the photosensitive element 323 is exposed on the second front side of the second plastic encapsulation layer 310. The second conductive vias 330 are disposed external to the driver chip 320 and extend through the second front side and the second backside. The third electrical connection structure is disposed on the second front side and electrically connected to the driver chip 320 on the same side. The fourth electrical connection structure is disposed on the second backside. The second conductive vias 330 electrically connect the third electrical connection structure to the fourth electrical connection structure. In order to minimize the thickness of the second plastic encapsulation, it is made as thick as the driver chip 320. Therefore, the driver chip 320 is exposed on both the front and back sides of the second plastic encapsulation layer 310.

Figure 5:
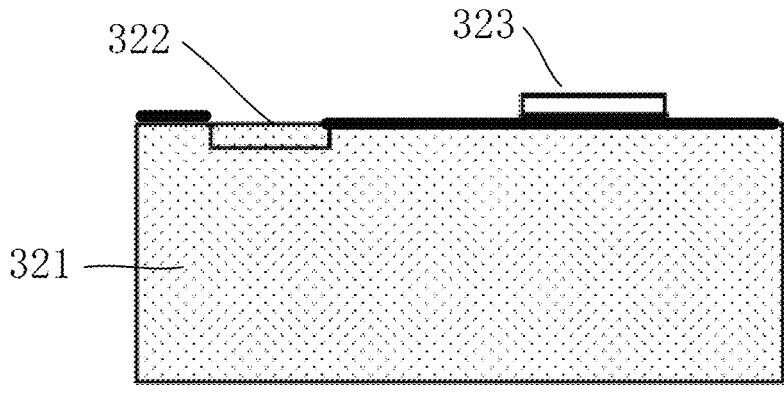
FIG. 5 is a schematic diagram showing the structure of a driver chip according to an embodiment of the present invention.

As shown in FIG. 5, the driver chip 320 further includes a main body 321 and an input/output (I/O) port 322. The I/O port 322 and the photosensitive element 323 are disposed on the same side of the main body 321 and spaced apart from each other. The main body 321 is disposed proximal to the second backside, and the I/O port 322 and the photosensitive element 323 are disposed proximal to the second front side. The I/O port 322 and the photosensitive element 323 are exposed on the second front side of the second plastic encapsulation layer 310, and a surface of the main body 321 distal from the photosensitive element 323 may be exposed on the second backside of the second plastic encapsulation layer 310, or not. The photosensitive element 323 can read the aforementioned clock frequency signal and feed it back to the main body 321, which then transmits the signal to the external processing unit through the I/O port 322.

The third electrical connection structure is electrically connected to the second conductive vias 330 at the second front side. It is also electrically connected to the I/O port 322 of the driver chip 320. The third electrical connection structure includes a fifth passivation layer 410, a third metal layer 420 and a sixth passivation layer 430, which are sequentially formed over the second front side. The fifth passivation layer 410 covers part of the second front side, as well as the driver chip 320, while the I/O port 322 and the photosensitive element 323 of the driver chip 320 are exposed from the fifth passivation layer 410. Moreover, the second conductive vias 330 are exposed on the second front side. The third metal layer 420 includes a plurality of third solder pads scattered on the fifth passivation layer 410. All the third solder pads are electrically connected to both the I/O port 322 and the second conductive vias 330.

The sixth passivation layer 430 covers both the fifth passivation layer 410 and the third metal layer 420. The fifth passivation layer 410 and the sixth passivation layer 430 are used to electrically isolate the third metal layer 420 to prevent it from being shorted. The photosensitive element 323 is exposed from the sixth passivation layer 430.

The fifth passivation layer 410 and the sixth passivation layer 430 are each made of an insulating material such as a polymer material. Examples of the polymer material may include PI, BCB, PBO and combinations thereof. The fifth passivation layer 410 and the sixth passivation layer 430 may be made of the same material or different materials. In the present embodiment, the fifth passivation layer 410 and the sixth passivation layer 430 are made of the same material such as PI.

The third metal layer 420 may be made of a metal material, such as Cu, Ag, W or Au, a conductive alloy, an inorganic material such as a conductive oxide (e.g., ITO), or a conductive organic material such as a conductive polymer. The third metal layer 420 may have a thickness of about 3 μm to 10 μm, preferably 3 μm to 5 μm, above a surface of the fifth passivation layer 410.

The fourth electrical connection structure is electrically connected to the second conductive vias 330 on the second backside. The fourth electrical connection structure includes a seventh passivation layer 440, a fourth metal layer 450 and an eighth passivation layer 460, which are sequentially formed over the second backside. The seventh passivation layer 440 covers the second backside and the driver chip 320 on the same side, while the second conductive vias 330 are exposed on the second backside. In greater detail, the seventh passivation layer 440 covers the second backside and a surface of the main body 321 distal from the photosensitive element 323, while the second conductive vias 330 are exposed on the second backside.

The fourth metal layer 450 includes a plurality of fourth solder pads, which are scattered on the seventh passivation layer 440 and electrically connected to the second conductive vias 330.

The eighth passivation layer 460 covers both the seventh passivation layer 440 and the fourth metal layer 450. The seventh passivation layer 440 and the eighth passivation layer 460 are used to electrically isolate the fourth metal layer 450 to prevent it from being shorted. There are at least two second via holes 470 in the eighth passivation layer 460, each second via holes 470 exposes the fourth metal layer 450. A conductive material is filled in the second via holes 470 to allow electrical connection to an external circuit (e.g., a PCB or FPC).

The seventh passivation layer 440 and the eighth passivation layer 460 are each made of an insulating material such as a polymer material. Examples of the polymer material may include PI, BCB, PBO and combinations thereof. The first passivation layer 210, the second passivation layer 230, the seventh passivation layer 440 and the eighth passivation layer 460 may be made of the same material. Alternatively, some of them may be made of the same material, while the remaining ones are made of different materials. Still alternatively, each of them may be made of a different material. In the present embodiment, the seventh passivation layer 440 and the eighth passivation layer 460 are made of the same material such as PI.

The fourth metal layer 450 may be made of a metal material, such as Cu, Ag, W or Au, a conductive alloy, an inorganic material such as a conductive oxide (e.g., ITO), or a conductive organic material such as a conductive polymer. The fourth metal layer 450 may have a thickness of about 3 μm to 10 μm, preferably 3 μm to 5 μm, above a surface of the seventh passivation layer 440.

In the light-emitting module of the present embodiment, the driver chip 320 is embedded in the plastic encapsulation material (second plastic encapsulation layer 310), and a thin-film wiring (the third metal layer 420, the fourth metal layer 450 and the second conductive vias 330) is fabricated on the plastic encapsulation material. This reduces the size of the optical sensor, resulting in space savings.

Figure 6:
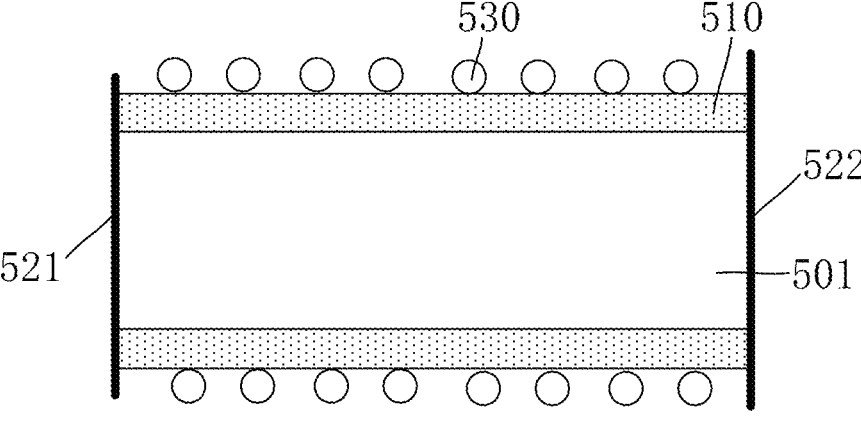
FIG. 6 is a schematic diagram showing the structure of a signal exciter according to an embodiment of the present invention.

As shown in FIG. 6, the signal exciter 20 is, for example, a closed hermetic chamber including a chamber body 321 open at its opposite ends and transparent closure members disposed at the respective openings at the opposite ends of the chamber body 321. The chamber body 321 includes a chamber member 510 open at its opposite ends and a coil 530 wound on the exterior of a wall of the chamber member 510. The chamber member 510 is, for example, a cylindrical barrel open at its opposite ends. The two transparent closure members are, for example, made of glass and circular in shape. They close the open ends of the chamber member 510 and respectively define the first optically transmissive end 521 proximal to the transmitter 10 and the second optically transmissive end 522 proximal to the receiver 30. Further, the chamber member 510, the first optically transmissive end 521 and the second optically transmissive end 522 together delimit a closed cavity 501, in which the metal rubidium or cesium is filled.

When the coil 530 is energized, it produces a magnetic field. Gaseous metal atoms (rubidium or cesium) in the closed cavity 501 of the hermetic chamber can move in a determined direction under the action of the magnetic field, and the hermetic chamber can shield external electromagnetic interference.

In operation, light emitted from the transmitter 10 travels through the light exit region 123, the optical filter structure 280 and the first optically transmissive end 521 and excites a transition of gaseous metal atoms in the hermetic chamber, generating a clock frequency signal on the order of picoseconds. The clock frequency signal propagates through the second optically transmissive end 522 and is captured by the photosensitive element 323 in the receiver 30, which then passes the received clock frequency signal on to the external processing unit. In the present embodiment, both the transmitter 10 and the receiver 30 are provided as plastic encapsulations with flat surfaces, which can be either vertically stacked, or horizontally juxtaposed, with the signal exciter 20. In this way, it is unnecessary to arrange the transmitter and the receiver on a PCB or couple them with a support frame, significantly reducing the size of the transmissive optical sensor.

Referring to FIGS. 1 to 6, in an embodiment of the present invention, there is provided a method of fabricating a transmissive optical sensor, which includes the steps as follows:

Step S1: Provide a first carrier plate and form a first plastic encapsulation on the first carrier plate. The first plastic encapsulation defines a light exit region 123.

Step S2: Provide a second carrier plate and form a second plastic encapsulation on the second carrier plate. The second plastic encapsulation has a photosensitive element 323.

Step S3: Provide a signal exciter 20, the signal exciter 20 has a first optically transmissive end 521 and a second optically transmissive end 522, which oppose each other, the signal exciter 20 is formed between the first and second plastic encapsulations, the light exit region 123 is oriented towards and aligned with the first optically transmissive end 521, the photosensitive element 323 is oriented towards and aligned with the second optically transmissive end 522.

Specifically, in Step S1, a first adhesive layer is formed on one side of the first carrier plate. The first carrier plate is, for example, rectangular or circular in shape and provided as a temporary carrier.

Next, a light-emitting unit is provided on the first adhesive layer. The light-emitting unit defines the light exit region 123 and is oriented towards the first carrier plate. A plastic encapsulation material is then applied around the light-emitting unit and solidified to form a first plastic encapsulation layer 110, the first plastic encapsulation layer 110 has a first front side and a first backside opposing the first front side. In the present embodiment, the light-emitting unit is exposed at both the first front side and the first backside of the first plastic encapsulation layer.

Subsequently, the first carrier plate is removed.

Afterwards, a plurality of first conductive vias 140 are formed in the first plastic encapsulation layer 110, the first conductive vias 140 extend through both the first front side and the first backside.

After that, a first electrical connection structure is formed on the first front side, and a second electrical connection structure on the first backside. The first electrical connection structure is electrically connected to the first conductive vias 140 on the first front side. Moreover, the first electrical connection structure is also electrically connected to a first electrode 121 in the light-emitting device 120. The second structure is electrically connected on the first backside to both the first conductive vias 140 and a conductive component 130.

An optical filter structure 280 is then attached to the first front side.

Specifically, in Step S2, a second adhesive layer is formed on one side of the second carrier plate. The second carrier plate is, for example, rectangular or circular in shape and provided as a temporary carrier.

Next, a driver chip 320 is provided on the second adhesive layer. The driver chip 320 includes a photosensitive element 323 which is oriented towards the second carrier plate. A plastic encapsulation material is then applied around the driver chip 320 and solidified to form a second plastic encapsulation layer 310, the second plastic encapsulation layer 310 has a second front side and a second backside opposing the second front side. In the present embodiment, the driver chip 320 is exposed at both the second front and back sides of the second plastic encapsulation layer 310.

Subsequently, the second carrier plate is removed.

Afterwards, a plurality of second conductive vias 330 are formed in the second plastic encapsulation layer 310, the second conductive vias 330 extend through both the second front side and the second backside.

After that, a third electrical connection structure is formed on the second front side, and a fourth electrical connection structure on the second backside. The third electrical connection structure is electrically connected to the second conductive vias 330 on the second front side. Moreover, the third electrical connection structure is also electrically connected to an I/O port 322 in the driver chip 320. The fourth electrical connection structure is electrically connected to the second conductive vias 330 on the second backside.

In summary, the present invention provides a transmissive optical sensor and method of fabricating it. The transmissive optical sensor includes a transmitter, a signal exciter and a receiver, which are sequentially stacked together. The transmitter includes a first plastic encapsulation, and the receiver includes a second plastic encapsulation. The first plastic encapsulation defines a light exit region, and the second plastic encapsulation has a photosensitive element. The signal exciter has a first optically transmissive end and a second optically transmissive end, which oppose each other. The light exit region is aligned with the first optically transmissive end, and the photosensitive element with the second optically transmissive end. According to the present invention, both the transmitter and the receiver are provided as plastic encapsulations with flat surfaces, which can be either vertically stacked, or horizontally juxtaposed, with the signal exciter. In this way, it is unnecessary to arrange the transmitter and the receiver on a PCB or couple them with a support frame, significantly reducing the size of the transmissive optical sensor.

Further, it is to be understood that, as used herein, the terms "first", "second" and the like are only meant to distinguish various components, elements, steps, etc. from each other and are not intended to indicate logical or sequential orderings thereof, unless otherwise indicated or specified.

It would be appreciated that while the invention has been described above with reference to preferred embodiments thereof, it is not limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent alternatives and modifications made to the foregoing embodiments based on the substantive disclosure of the invention without departing from the scope thereof fall within the scope.

The invention claimed is:

1. A transmissive optical sensor, comprising a transmitter, a signal exciter and a receiver, which are sequentially stacked together, the transmitter comprising a first plastic encapsulation, the receiver comprising a second plastic encapsulation, the first plastic encapsulation defining a light exit region, the second plastic encapsulation having a photosensitive element, the signal exciter having a first optically transmissive end and a second optically transmissive end, which oppose each other, the light exit region aligned with the first optically transmissive end, the photosensitive element aligned with the second optically transmissive end.

2. The transmissive optical sensor of claim 1, wherein the first plastic encapsulation comprises a first plastic encapsulation layer, a light-emitting unit, first conductive vias, a first electrical connection structure and a second electrical connection structure, the first plastic encapsulation layer having a first front side and a first backside opposing the first front side, the light-emitting unit defining the light exit region on the first front side, the light-emitting unit embedded in the first plastic encapsulation layer, at least the light exit region is exposed on the first front side of the first plastic encapsulation layer and the at least a surface portion of the light-emitting unit is exposed on the first backside, the first conductive vias disposed external to the light-emitting unit and extending through the first front side and the first backside, the first electrical connection structure disposed on the first front side and electrically connected to the light-emitting unit, the second electrical connection structure disposed on the first backside and electrically connected to the light-emitting unit, the first electrical connection structure electrically connected to the second electrical connection structure by the first conductive vias.

3. The transmissive optical sensor of claim 2, wherein the light-emitting unit comprises a light-emitting device and a conductive component, the conductive component electrically connected to the light-emitting device, the light-emitting device disposed proximal to the first front side, the conductive component disposed proximal to the first backside, the conductive component exposed on the first backside of the first plastic encapsulation layer, and wherein the light exit region exposed on the first front side of the first plastic encapsulation layer.

4. The transmissive optical sensor of claim 3, wherein the light-emitting device comprises a light-emitting body, a first electrode, a second electrode and the light exit region, the first electrode disposed proximal to the first backside, the second electrode disposed on a same side as the light exit region and proximal to the first front side, wherein light is emitted from the light exit region during operation of the light-emitting unit, and wherein the second electrode and the light exit region are exposed on the first front side of the first plastic encapsulation layer, and the conductive component is exposed on the first backside of the first plastic encapsulation layer.

5. The transmissive optical sensor of claim 2, wherein the transmitter further comprises an optical filter structure which is affixed to the first plastic encapsulation, the light exit region is oriented towards the optical filter structure.

6. The transmissive optical sensor of claim 1, wherein the second plastic encapsulation comprises a second plastic encapsulation layer, a driver chip, second conductive vias, a third electrical connection structure and a fourth electrical connection structure, the second plastic encapsulation layer having a second front side and a second backside opposing the second front side, the driver chip having the photosensitive element on the second front side, the driver chip embedded in the second plastic encapsulation layer, at least the photosensitive element is exposed on the second front side of the second plastic encapsulation layer, the second conductive vias disposed external to the driver chip and extending through the second front side and the second backside, the third electrical connection structure disposed on the second front side and electrically connected to the driver chip, the fourth electrical connection structure disposed on the second backside, the third electrical connection structure electrically connected to the fourth electrical connection structure by the second conductive vias.

7. The transmissive optical sensor of claim 6, wherein the driver chip further comprises a main body and an input/output port, the input/output port disposed on a same side of the main body as the photosensitive element and spaced apart from the photosensitive element, the main body disposed proximal to the second backside, the input/output port and the photosensitive element disposed proximal to the second front side, the input/output port and the photosensitive element exposed on the second front side of the second plastic encapsulation layer.

8. The transmissive optical sensor of claim 1, wherein the signal exciter is a closed hermetic chamber.

9. The transmissive optical sensor of claim 8, wherein the hermetic chamber comprises a chamber body open at opposite ends thereof and transparent closure members disposed at the respective openings at the opposite ends of the chamber body, the chamber body comprising a chamber member open at opposite ends thereof and a coil wound on the exterior of a wall of the chamber member, the two transparent closure members closing the respective openings at the opposite ends of the chamber body, thereby defining a closed cavity, wherein the first optically transmissive end is defined proximal to the transmitter and the second optically transmissive end is defined proximal to the receiver.

10. The transmissive optical sensor of claim 9, wherein the metal rubidium or cesium is filled in the closed cavity.

11. The transmissive optical sensor of claim 10, wherein the openings of the chamber member at the opposite ends thereof match in shape with the transparent closure members, and wherein the transparent closure members are made of glass.

12. A method of fabricating the transmissive optical sensor of claim 1, comprising the steps of:

providing a first carrier plate and forming the first plastic encapsulation on the first carrier plate, wherein the first plastic encapsulation defines the light exit region;

providing a second carrier plate and forming the second plastic encapsulation on the second carrier plate, wherein the second plastic encapsulation has the photosensitive element; and providing the signal exciter having the first optically transmissive end and the second optically transmissive end, which oppose each other, wherein the signal exciter is formed between the first plastic encapsulation and the second plastic encapsulation, the light exit region is aligned with the first optically transmissive end and the photosensitive element with the second optically transmissive end.

13. The method of claim 12, wherein forming the first plastic encapsulation comprises:

providing the first carrier plate and forming a first adhesive layer on one side of the first carrier plate;

providing the light-emitting unit on the first adhesive layer, which defines the light exit region, the light exit region is oriented towards the first carrier plate, applying a plastic encapsulation material around the light-emitting unit, and solidifying the plastic encapsulation material to form the first plastic encapsulation layer having the first front side and the first backside opposing the first front side;

removing the first carrier plate;

forming the plurality of first conductive vias in the first plastic encapsulation layer, the plurality of first conductive vias extend through the first front side and the first backside;

US 12,566,135 B2

15 forming the first electrical connection structure on the first front side and the second electrical connection structure on the first backside, wherein the first electrical connection structure is electrically connected to the first conductive vias on the first front side and to the first electrode in the light-emitting device, and the second structure is electrically connected to the first conductive vias and the conductive component on the first backside; and attaching the optical filter structure to the first front side.

14. The method of claim 12, wherein forming the second plastic encapsulation comprises:

providing the second carrier plate and forming a second adhesive layer on one side of the second carrier plate;

providing the driver chip on the second adhesive layer, which has the photosensitive element, the photosensitive element is oriented towards the second carrier plate, applying a plastic encapsulation material around the driver chip, and solidifying the plastic encapsulation material to form the second plastic encapsulation layer having the second front side and the second backside in opposing the second front side;

removing the second carrier plate;

forming the plurality of second conductive vias in the second plastic encapsulation layer, the plurality of second conductive vias extend through the second front side and the second backside; and forming the third electrical connection structure on the second front side and the fourth electrical connection structure on the second backside, wherein the third electrical connection structure is electrically connected to the second conductive vias on the second front side and to the input/output port in the driver chip, and the fourth structure is electrically connected to the second conductive vias on the second backside.

* * * * *